Inventors:
Harold V. Rutkus and
Charles J. Greiner

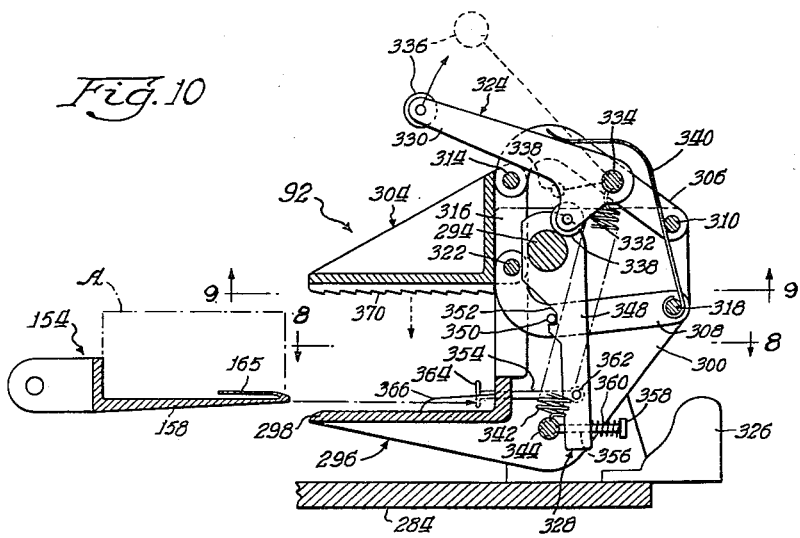
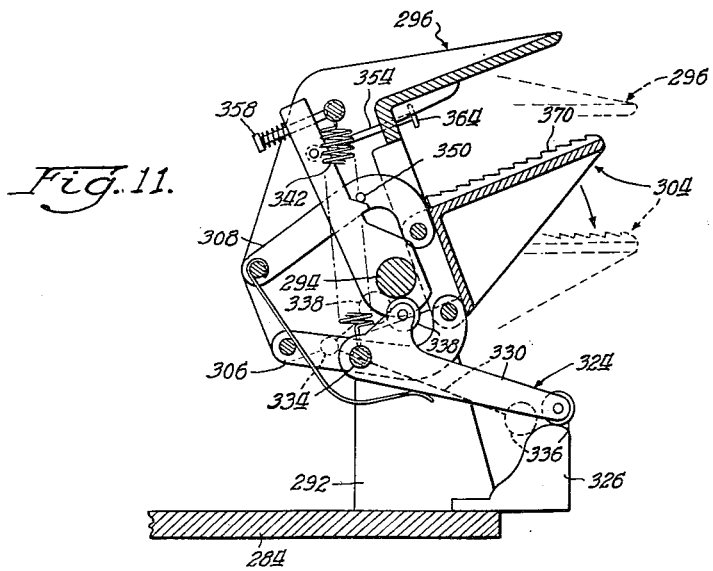

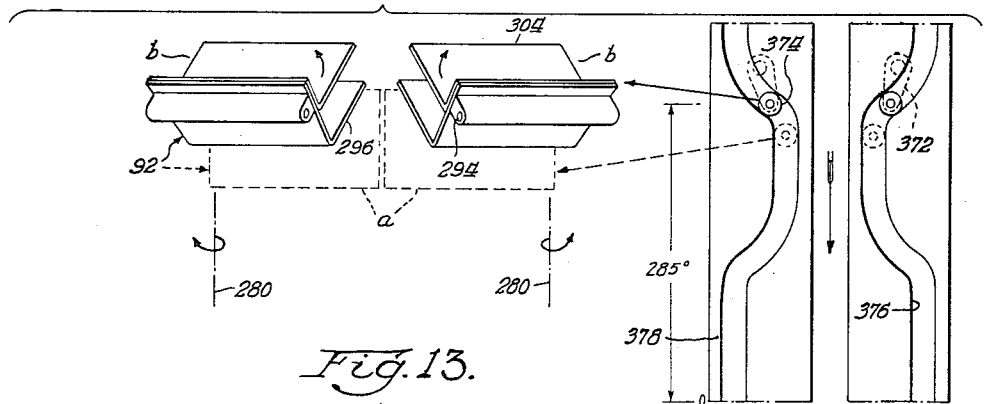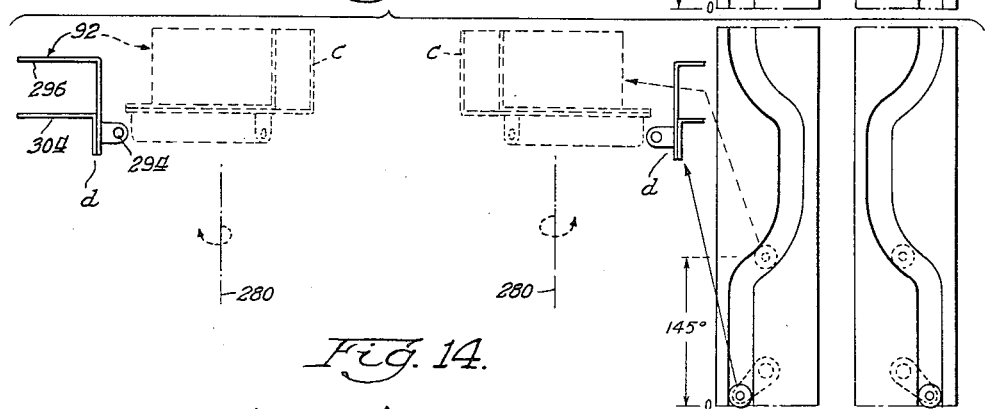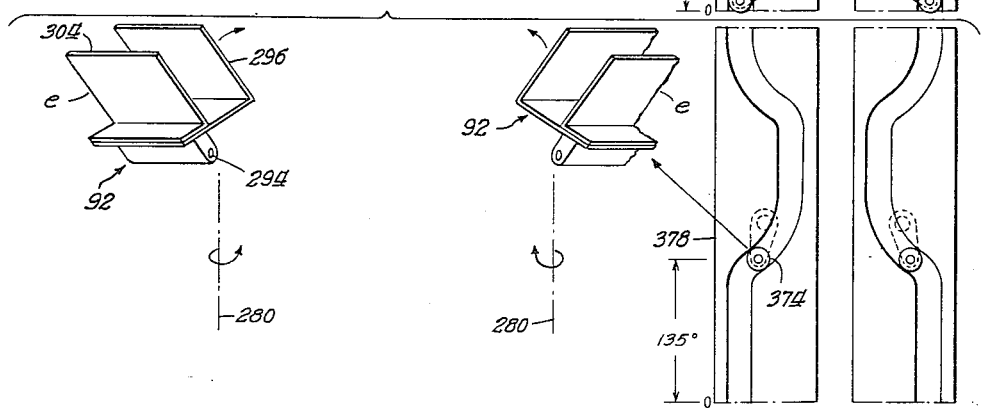

Sept. 4, 1956 H. V. RUTKUS ET AL 2,761,506
JAW MECHANISM FOR GRASPING SHEET MATERIAL THEREBETWEEN
AND MOVING SAME TO A NEW POSITION
Filed Jan. 4, 1954 10 Sheets-Sheet 10
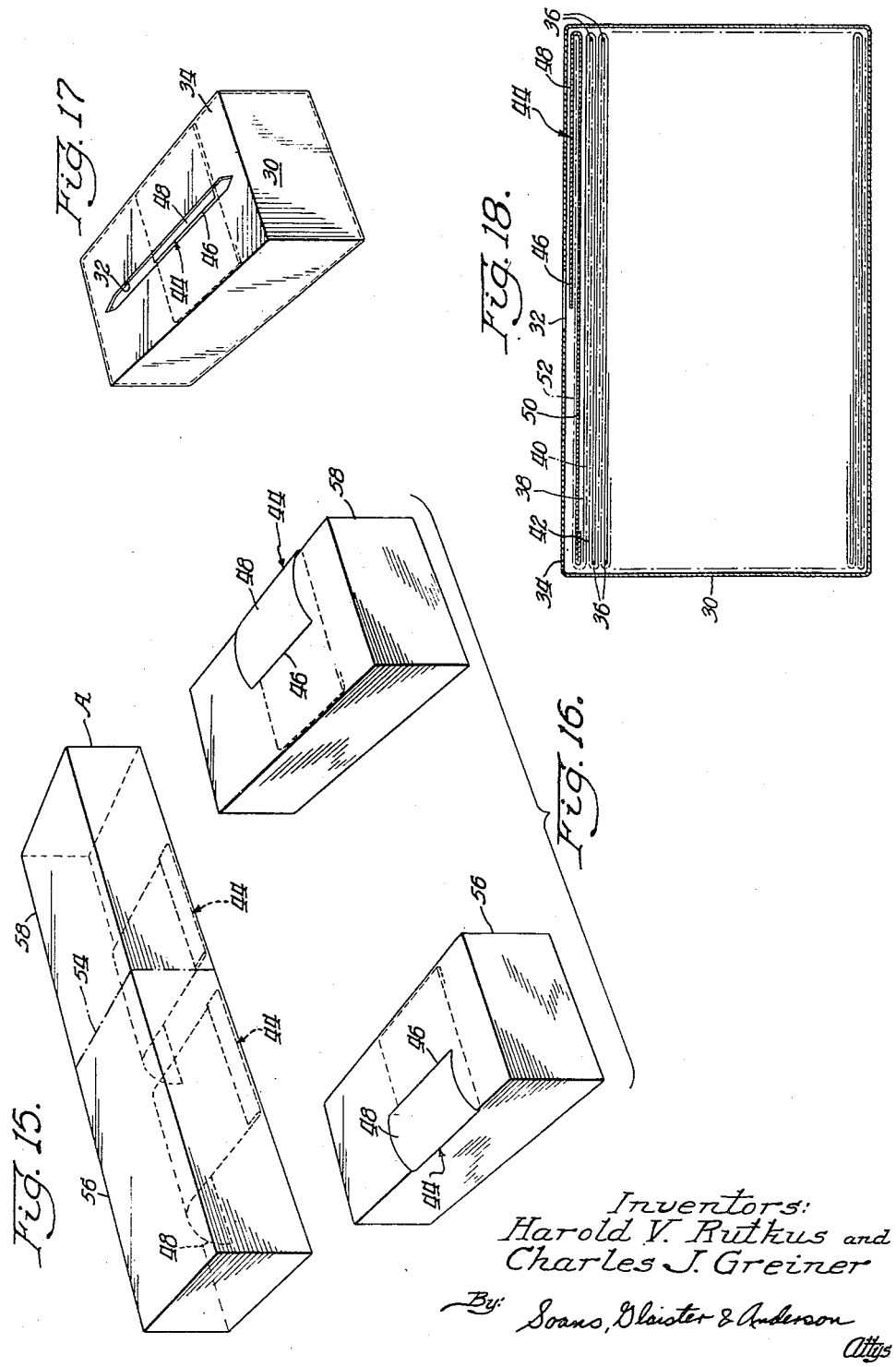
Inventors:
Harold V. Rutkus and
Charles J. Greiner
By Soans, Glaister & Anderson
Attys

United States Patent Office 2,761,506
Patented Sept. 4, 1956

2,761,506

JAW FOR GRASPING SHEET MATERIAL THEREBETWEEN AND MOVING SAME TO A NEW POSITION

Harold V. Rutkus, Neenah, and Charles J. Greiner, Menasha, Wis., assignors, by mesne assignments, to Kimberly-Clark Corporation, a corporation of Delaware Application January 4, 1954, Serial No. 401,774

8 Claims. (Cl. 164—84.5)

The present invention relates generally to material handling mechanism, and is more particularly directed to a novel and improved form of jaw mechanism for grasping sheet material therebetween and moving same to a new position. This invention is concerned with a portion of the structure which is also disclosed in our copending application Serial No. 401,942, filed January 4, 1954.

The primary object of the present invention is to provide a new and improved form of carrier device for transporting material between spaced positions. A further object of the invention is to provide a jaw-type of carrier which alters the position of the material being handled as it is being transported between two selected positions. Another object is to provide a jaw-type of carrier which includes a novel and improved means for opening and closing the jaws. Other objects and advantages will become apparent as the disclosure progresses with respect to the accompanying 10 sheets of drawings, wherein:

Fig. 10 is a sectional view taken along the line 10—10 in Fig. 7.

Fig. 11 is a view similar to Fig. 10, showing different positions of the breaker jaws.

Figure 1:
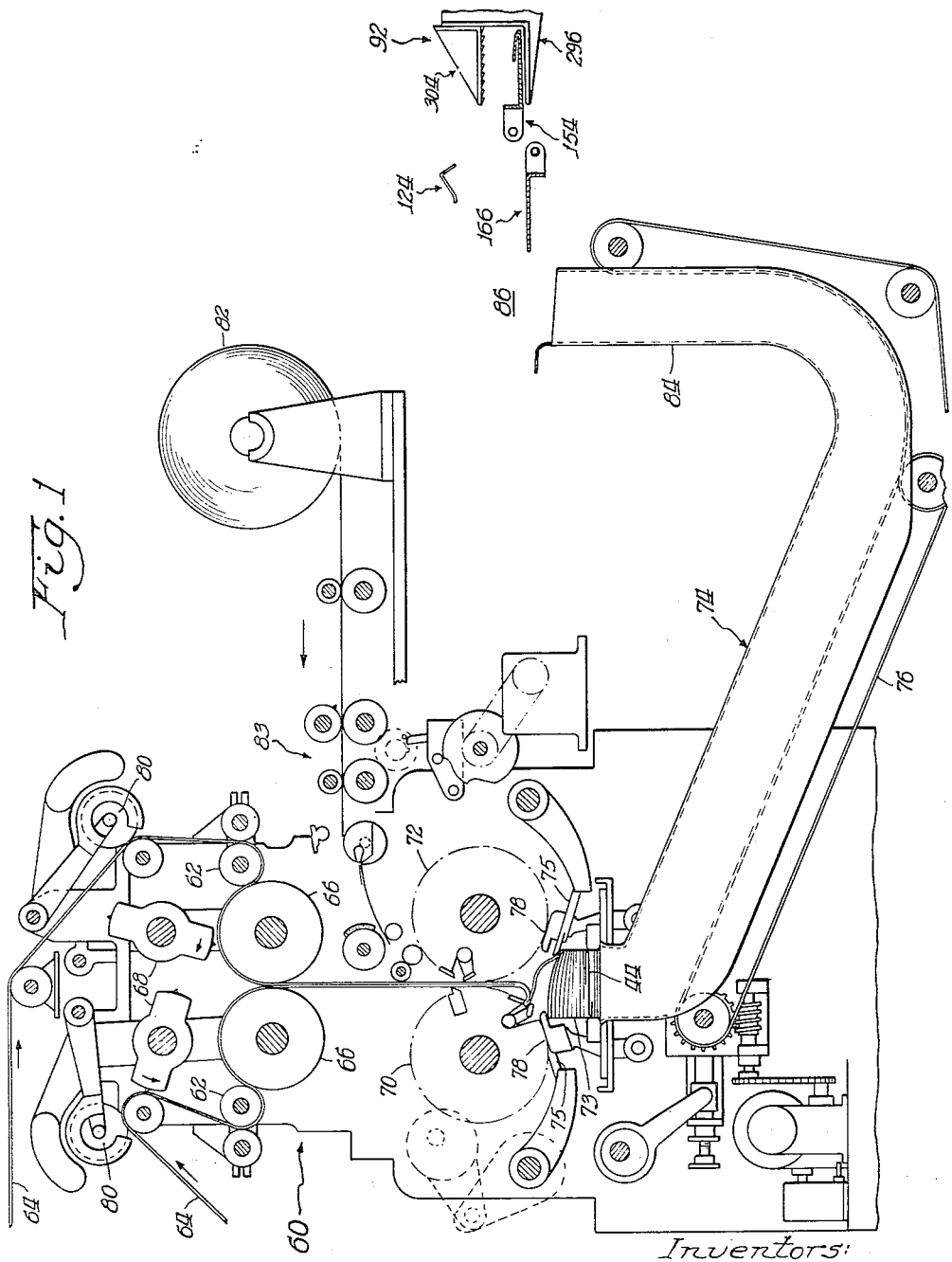
Fig. 1 is a diagrammatic showing of mechanism chosen to illustrate the present invention.

Figs. 12—14 are diagrammatic views of the breaker jaws in different operating positions, as related to the operating position of the cams which actuate the jaws.

Fig. 15 is a perspective view of the double pack before separation.

Fig. 16 is a perspective view of the separated portions of the pack in Fig. 15.

Fig. 17 is a perspective view of a package of tissues.

Fig. 18 is an enlarged cross section of a package of tissues.

The present invention will be disclosed in connection with apparatus for producing packs of facial tissues, although it will be apparent as the disclosure progresses that the principles of this invention may be widely employed and the invention is not thereby limited.

The described embodiment may be more clearly understood by reference to the commercial package of tissues (Figs. 17 and 18) which is desired to be produced. This package consists of a box 30 having a narrow slot 32 approximately the length of the box in the top wall 34 thereof. The interfolded tissues are diagrammatically represented by single lines within the box (Fig. 18) and these tissues are folded to provide overlapping folds of approximately equal width. The type of fold illustrated is generally referred to as an interfold. The free ends of the legs of tissues are disposed end to end and interconnected by small easily breakable bonds 36. The folded tissue 38 near the top of the box embraces the lower leg 40 of the next underlying tissue. The lower leg 40 is connected by the fold to the upper leg which is embraced within the uppermost folded tissue.

A pull out or starting sheet 44 is disposed at the top of the box and in interfolded relation to the adjacent tissues, with the free edge 46 of the upper fold 48 of the pull out sheet accessible within the area of the slot 32 in the top wall of the box. The overall width of the pull out sheet is preferably somewhat less than the length of the slot 32. The upper fold 48 and the main fold 50 of the pull out sheet embrace the upper leg 52 of the top tissue, in order that movement of the upper fold 48 of the pull out sheet 44 will be accompanied by a similar movement of the upper fold 52 of the top tissue with the latter being partially withdrawn through the slot 32.

The tissue sheets are preferably formed in continuous stacks having the pull out sheets 44 at predetermined intervals throughout the stack. Furthermore, the stack has a width which, in the illustrated instance, is twice the length of the commercial pack of tissues, and the stack is divided into two similar sections 56 and 58 by a line of readily breakable bonds 54 formed by incompletely slitting the tissue forming web longitudinally prior to the folding of the web.

The present invention is particularly concerned with the problem of effectively receiving the double packs of tissue sheets, after they have been separated from the stack, and breaking the double pack along the line of breakable bonds 54, while simultaneously moving the individual packs to spaced apart positions for packaging or the like.

For the purpose of simplifying the present description, it will be considered that the separating mechanism 86 and the carriers 92 are disposed at the forward side of the interfolder 60 and that the forward end of the separating mechanism is, therefore, the end farthest from the interfolding machine.

With reference particularly to Figure 1, it is seen that the apparatus chosen to illustrate the present invention is a rotary interfolding machine 60 of the type disclosed in the Sabee et al. application, Serial No. 308,996, filed September 11, 1952. Included in this machine are a series of guide rolls 62 for guiding a pair of webs 64 so as to cause them to pass over a pair of anvil rolls 66. Rotary knives or knife carriers cooperate respectively with the anvil rolls 66 to slit the webs 64 transversely, preferably in such a manner as to preserve slit bonds at the lines of the transverse cuts so as to maintain continuity of the web for passage between a pair of cooperating interfolding rolls 70 and 72. These interfolding rolls effect alternate opposite folding of the two webs 64, and the depositing of the folded web in a stack 73 which is suitably guided for movement through the guide chute 74. The guide chute includes a conveyor belt 76, which is suitably controlled to advance the stack at the rate required to maintain the top of the stack in substantially constant relationship to the interfolding rolls 70 and 72. Suitable packers 75 operate on opposite sides of the stack 73 together with suitable hold down devices 78 to hold the top of the stack down in predetermined relationship to the interfolding rolls.

As indicated above, in the illustrated instance there is employed tissue webs of twice the width of the desired tissue package, these webs being suitably slitted longitudinally by slitter wheels or disks 80. As the tissues enter the interfolding apparatus the slit thus formed is substantially complete, but leaves sufficient bond to hold the web portions on opposite sides of the slit in edge to edge relation for passage through the interfolding apparatus as a unit.

The starter sheets 44 are supplied from rolls of suitable paper strips 82, which may be printed with any desired notice or data. It is preferable that the starter sheets be formed of calendered paper, in order to provide a smooth stiffened insert sheet which will carry the top tissue with it when it is withdrawn from the package, and which will readily afford separation of the individual packs from the stack 73 in the manner of the present invention. The strips of paper from the rolls 82 are fed through suitable mechanism, indicated generally at 83 which serves to cut the strips into sheet units and to fold the units into the desired form. The folded starter sheets are then automatically fed into the interfolded mechanism, at predetermined intervals regulated by the latter, so as to properly position the sheets in the stack of tissues.

Figure 2:
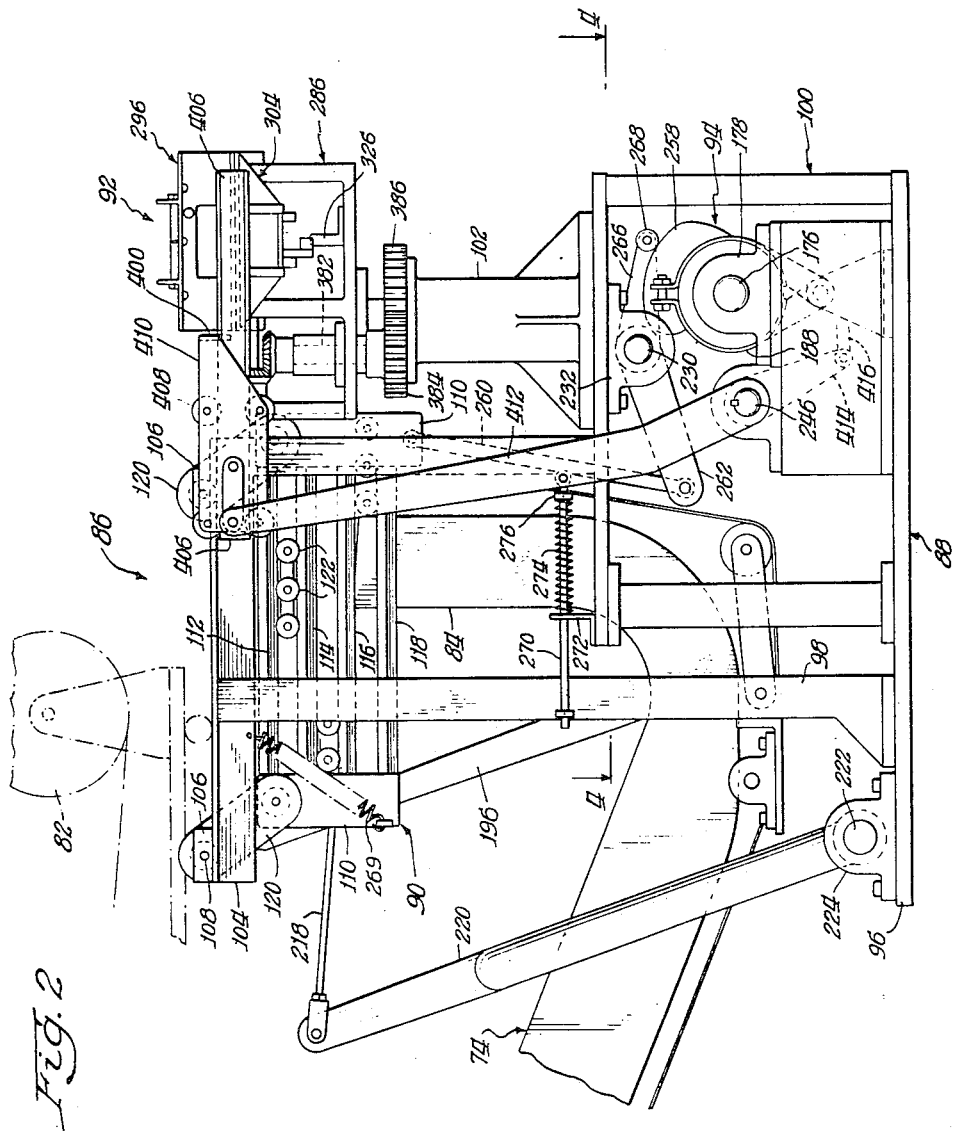
Fig. 2 is a side view of the pack separating mechanism which is shown diagrammatically in Fig. 1.
Figure 6:
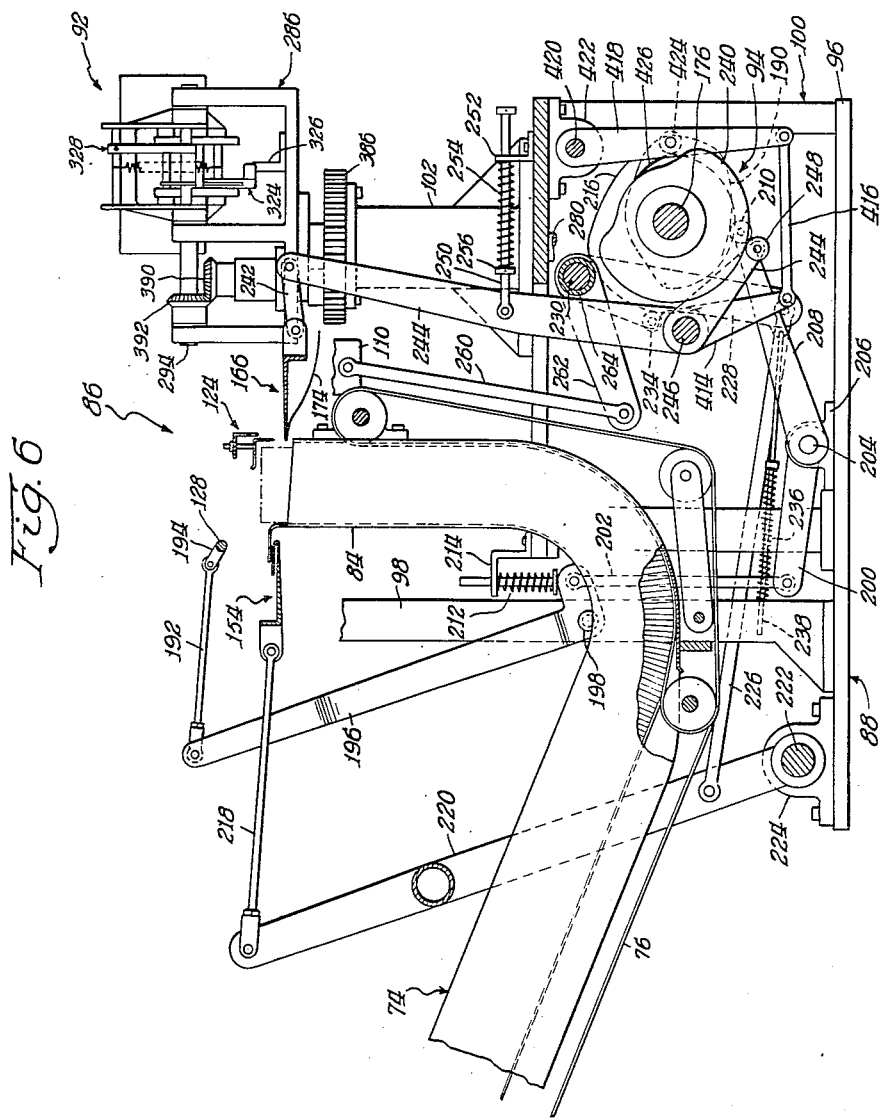
Fig. 6 is a sectional view taken along the line 6—6 in Fig. 5, with certain of the parts shown in a different operating position and other elements omitted.

As seen particularly in Figs. 2 and 6, the end of the guide chute 74 terminates in a vertical section 84 to thereby direct the moving stacking of tissues upwardly. A stack separating mechanism 86 is disposed adjacent the terminal end of the chute 74 in position for removal of the packs from the stack as they reach the end of the chute. This stack separating mechanism comprises generally a frame structure 88 (Fig. 2), a movable carriage structure 90 supported on the frame structure adjacent the upper end of the stack, a pair of carriers or breaker jaws 92, and the drive mechanism 94 for operating the relatively movable parts of the separating mechanism.

The frame structure 88 for supporting the separating mechanism comprises a base 96, a pair of vertically extending posts 98, a sub-frame assembly 100 supported on the base and providing a housing for the drive mechanism, a pair of cylindrical upright members 102 fixed to the top of the sub-frame, and a pair of side members 104 supported on the upper ends of the posts 98 and the upright members 102. As noted in Fig. 2, the side frame members 104 also provide a support for the structure mounting the rolls of paper 82 from which the starter sheets 44 are cut.

The details of the pack separating mechanism 86, with respect to the removal of a predetermined portion of the tissues moving upwardly in the vertical section 84 of the guide chute, are completely described in the above-mentioned copending application Serial No. 401,942 and, therefore, a description of this portion of the machine will not be included herein. The present invention is particularly concerned with the means for receiving the separated pack and for handling same in a manner affording removal of the separable sections for packaging. Consequently, the description of the illustrated apparatus will be generally limited to the latter means.

The pack separating machine 86 also includes the pair of carriers or breaker jaws 92 for receiving the separated pack and conveying the two separable portions thereof to a predetermined position for removal to a packaging mechanism or the like (not shown). Looking at Figs. 2, 3, 5 and 6, it is seen that the carriers are supported on the sub-frame 100 at the forward end of the carriage 90, and these carriers are movable from the position shown to a position indicated in Fig. 1, during the removal of the pack from the end of the chute 74, to receive the separated pack from the transfer plate 154. As will be pointed out in detail, the movement of the carriers 92 from the position indicated in Fig. 1 to the position seen in Fig. 2 is effective to break the double pack of tissues and position the separated pack portions for movement to a packaging apparatus or the like.

The support means for each of the breaker jaws 92 comprises a cylindrical upright member 102 which is fixed to the top of the sub-frame 100. A vertical shaft 280 (Fig. 5) extends upwardly through a center opening in the cylindrical member 102 and this shaft is rotatable within the latter member. The upper end of the shaft 280 has fixed thereto a circular plate 282 to which is secured a larger plate 284 forming the base of a mounting frame 286 for the breaker jaw.

Figure 7:
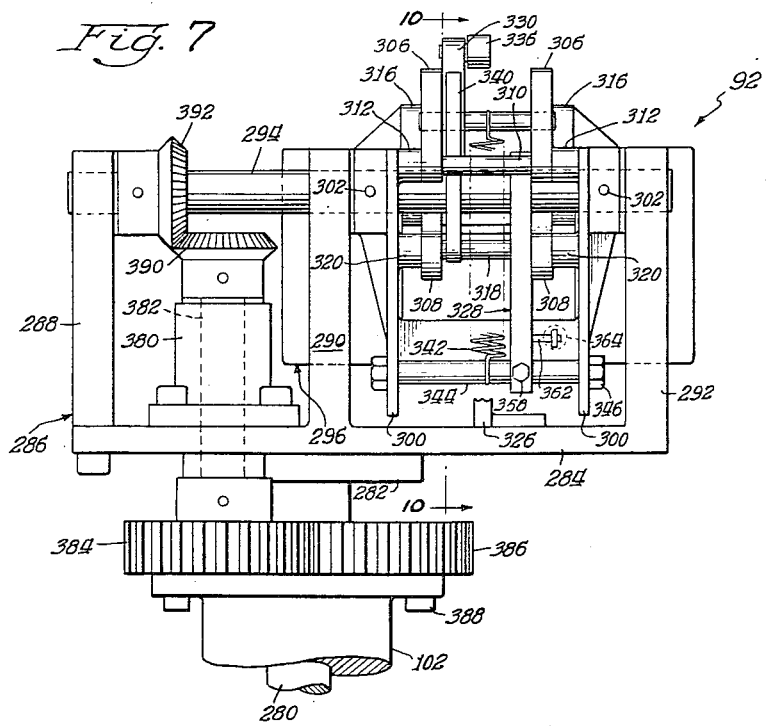
Fig. 7 is an enlarged fragmentary view of the structure in Fig. 2.

Looking particularly at Fig. 7, it is seen that the jaw-supporting frame 286 includes three spaced-apart vertical members 288, 290 and 292 which have aligned openings at their upper end portions, to thereby provide a bearing support means for a rotatable shaft 294 which provides a horizontal pivot mounting for the breaker jaw. The lower portion 296 of the breaker jaw 92, as seen in Fig. 7, comprises a right-angle forming structure with one flange 298 (Fig. 10) forming the bottom part of the jaw 92 when the latter is in its pack-receiving position. The lower jaw portion 296 includes a pair of integrally formed webs 300 which extend vertically to the rear of the flange 298. The webs 300 have a pair of aligned openings (not shown) at their upper ends for mounting the jaw portion 296 on the shaft 294 in fixed relation thereto, as by a pair of pins 302.

An upper portion 304 of the breaker jaw is supported on the webs 300 for relative movement by means of two pairs of links 306 and 308. The upper pair of links 306 are pivotally mounted at one end on a pin 310 carried on the webs 300 by aligned bearings 312 formed on the latter. The other ends of the links 306 are pivotally connected with another pin 314 which extends between a pair of short flange portions 316 extending outwardly from the back of the upper jaw portion 304.

The lower pair of links 308 are pivotally mounted at one end on a pin 318 disposed below and parallel to the pin 310 which carries the upper links 306. A pair of bearing bosses 320 on the webs 300, similar to the bearing elements 312, provide a support for the pin 318. The links 308 extend forwardly to a pivotal connection with a pin 322 carried by the flanges 316 in a position below and parallel to the upper pivot pin 314 (Fig. 10).

Thus it is seen that the pivot axes for the links 306 and 308 are disposed at the four corners of a parallelogram, to thereby provide for a movement of the upper jaw portion 304 through a path generally normal to the pack-supporting flange 298 of the lower jaw portion 296. The described type of relative movement of the jaw portions avoids any damaging of the tissue sheets during the opening and closing of the jaws.

The movement of the upper jaw portion 304 with respect to the lower jaw is controlled by means including a cam follower arm 324, a cam 326, and a latch 328. The follower arm 324 (Fig. 10) is in the form of a bell crank which is pivotally mounted, at the intersection of its arm portions 330 and 332, on a cross pin 334 which is carried between the upper links 306. The free end of the arm 330 rotatably mounts a cam follower 336 in position for engagement with the cam 326 which is fixed to the jaw-supporting plate 284 in upwardly extending relation thereto. The follower arm portion 332 extends generally in the direction of the rotatable shaft 294 and has a follower 338 rotatably secured to its outer end in position for engagement with the shaft 294. A flat spring member 340 is secured at one of its ends to the link supporting pin 318, and this spring extends upwardly and forwardly to a position of pressing engagement with the upper surface of the arm 330 to thereby bias the cam follower 338 against the shaft 294.

The jaw portions 304 and 298 (Figs. 7, 10 and 11) are biased toward a closed position by means of a coil spring 342, which is disposed between the pin 334, carried between the upper links 306, and an underlying pin 344. The pin 334 extends through aligned openings in the lower portion of the webs 300 and is secured in position by a pair of nuts 346 on threaded outer end portions of the pins.

The latch mechanism 328, which is operable to hold the jaw portions 304 and 298 in an open position, includes a lever 348 pivotally mounted at one end on the rotatable shaft 294, a latch pin 350 on one of the lower links 308 in position for engagement with a notch 352 on the lever 348, and an actuating pin 354 pivotally mounted on a lower portion of the lever 348 and extending outwardly therefrom to a position overlying the pack-supporting surface of the lower jaw flange 298. The lever 348 is biased toward a position wherein the notch 352 engages the pin 350, by means including an elongated spring guide 356 extending through an opening (not shown) in the lower end of the lever and fixed to the pin 344. The spring guide 356 is formed with an enlarged outer end portion 358, and a coil spring 360 is interposed between the lever 348 and the seat provided by the end portion 358.

The actuating pin 354 is mounted at one end on a pivot pin 362 projecting laterally from the lever 348. The pin 354 extends through an opening (not shown) in the back of the lower jaw 296 and terminates in a circular head portion 364 disposed in closely overlying relation to the jaw flange 298.

Figure 8:
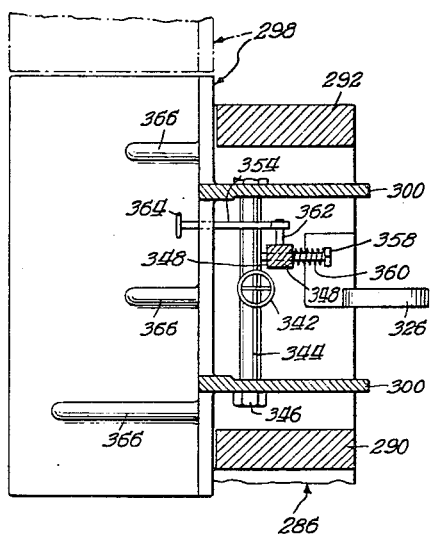
Fig. 8 is a section taken along line 8—8 in Fig. 10.

As seen particularly in Fig. 10, the entry of the transfer plate structure 154 into the breaker jaw 92 establishes a contact between the transfer plate 158 and the actuating pin head 364, which moves the latter to the rear of the jaw. This movement is transferred to the lever 348 to swing the latter counterclockwise about the shaft 294, against the pressure of spring 360, and release the pin 350 from the notch 352. The larger coil spring 342 will then act on the upper links 306 to pull the upper jaw portion 304 downwardly into clamping engagement with the tissue pack, which is now primarily supported on a series of transverse ribs 366 (Fig. 8) extending upwardly from the flange 298 and between the cut away sections 162 in the transfer plate 158. The latter construction permits withdrawal of the transfer plate 158 while the jaw 92 firmly engages the pack of tissues.

As the upper jaw-supporting levers 306 and 308 move downwardly with the upper jaw 304, the pin 334 carried by the upper lever 306 and supporting the follower arm 324 also moves down to thereby cause the follower 338 to move upwardly on the shaft 294. This latter movement shifts the follower arm to the position indicated by broken lines in Fig. 10, wherein the roller 336 is disposed for timely engagement with the cam 326 to open the jaws and release the tissue packs in a manner to be later described.

Figure 9:
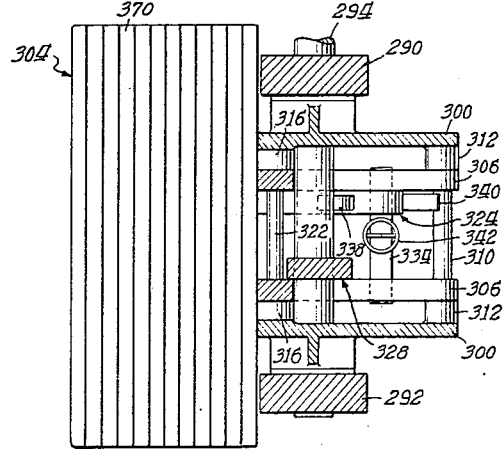
Fig. 9 is a section taken along line 9—9 in Fig. 10.

As indicated above, the pack-supporting surface of the lower jaw 296 includes the transverse ribs 366 (Fig. 8) which permit movement of the pack transversely of the jaw but prevent longitudinal shifting of the pack in the jaw. Furthermore, these ribs 366 provide an elevated support, with respect to the flange 298, which permits withdrawal of the transfer plate 158 from the jaw without causing any undesired disturbance of the tissue pack. The pack engaging surface 370 of the upper jaw 304 is grooved longitudinally of the jaw (Fig. 9) to prevent any transverse shifting of the tissue pack, while permitting movement of the pack lengthwise in the jaw. The details of the function of the jaws will be more fully explained in connection with the description of the operation of the entire pack-separating machine.

The drive means 94 for the pack separating means 86 (Fig. 3) comprising generally a motor 180, a main cam shaft 176, and a power transmitting means between the motor and the cam shaft including a gear box 182 and a chain drive 184. The opposite end portions of the cam shaft 176 are journalled in suitable bearings 178 which are supported in elevated relation to the base 96 of the main frame 88. Also disposed at one end of the cam shaft is a single revolution clutch 186 (Fig. 5) which is electrically operated through means including the control switch 152 mounted on the pusher mechanism 124. The other end of the shaft 176 includes a brake mechanism 188 for preventing overrunning of the shaft due to the momentum of the rotating cams.

Figure 4:
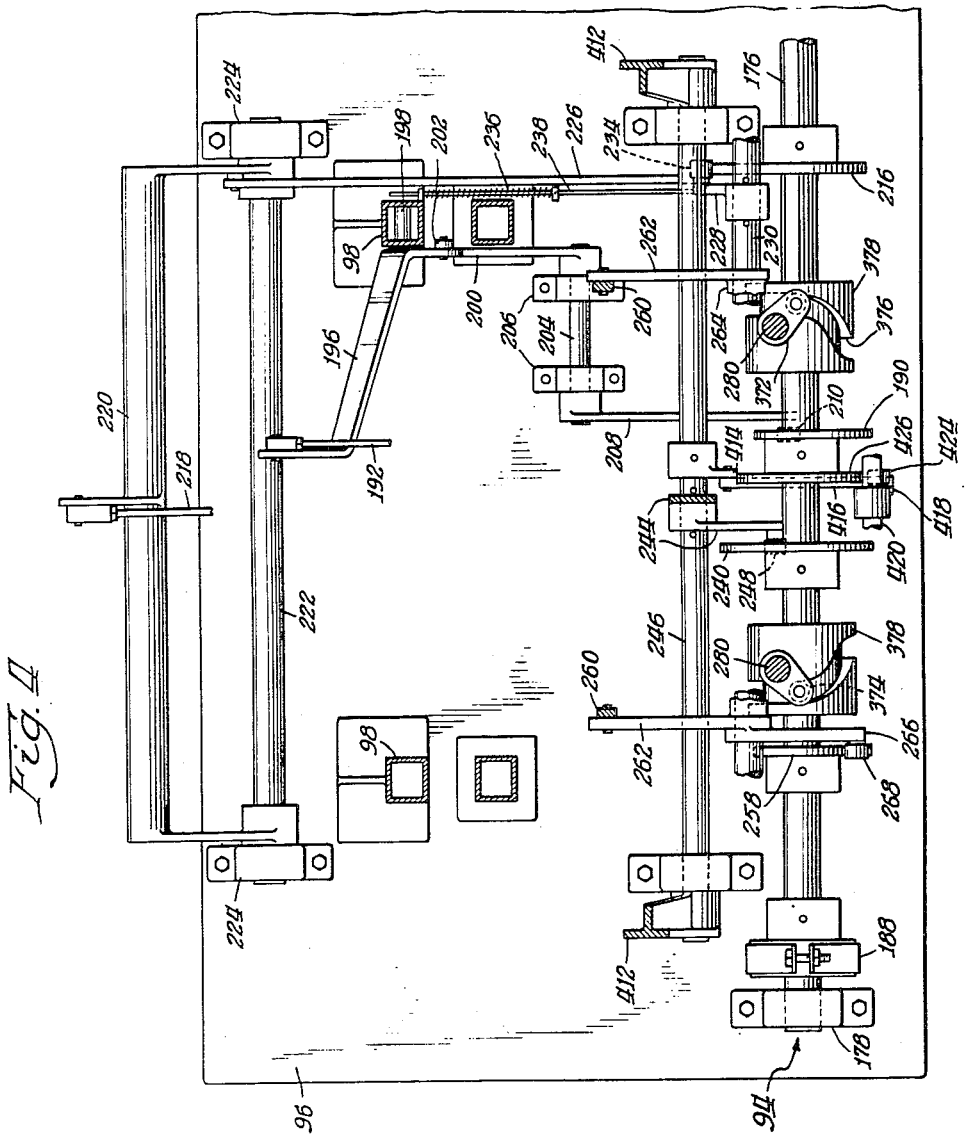
Fig. 4 is a sectional view taken generally along the line 4—4 in Fig. 2.

The drive mechanism for the breaker jaws 92 includes the vertical shafts 280 which are rotatably mounted within the housings provided by the cylindrical members 102. The lower end of each of the shafts 280 has fixed thereto a laterally extending arm 372 (Figs. 4 and 5), which supports a depending roller 374 in position for engagement with a groove 376 formed in the surface of a cam 378 fixed to the cam shaft 176. The upper end of the shaft 280 has the jaw-supporting plates 282 and 284 fixed thereto for rotation with the shaft. The plate 284 has mounted thereon, between the vertical members 288 and 290 (Fig. 7), a bearing structure 380 which rotatably supports a vertical lay shaft 382. The lower end of the lay shaft 382 has fixed thereto a spur gear 384, which is disposed for engagement with a larger gear 386 non-rotatably fixed on the upper end of the member 102, as by the bolts 388.

The upper end of the shaft 382 carries a relatively fixed, bevel gear 390 is position for engagement with a bevel gear 392 which is fixed to the horizontal shaft 294 for rotation therewith. Thus it is seen that, as the shaft 176 (Fig. 5) rotates, the cam 378 effects a rotary motion of the vertical shaft 280 between the limits of an arc determined by the cam groove 376. The rotation of the shaft 280 moves the entire jaw supporting frame 286 (Fig. 7) about the axis of shaft 280, thereby effecting a rotation of the lay shaft 382 as the gear 384 moves around the fixed gear 386. This rotation of the shaft 280 is transmitted to the horizontal shaft 294, through the bevel gears 390 and 392, to provide for vertical swinging movement of the breaker jaw structure fixed to shaft 294.

It is seen, therefore, that the arrangement of the jaw structure and its drive mechanism affords both a horizontal and a vertical swinging movement of the jaws 92. Briefly, the horizontal movement of the jaws is through an angle of 90°, as illustrated by the two positions shown in Figs. 5 and 6. The vertical movement of the jaws 92 is through an angle of 180°, with the jaws being completely inverted during their travel from the pack-receiving position in Fig. 1 to the pack discharging position in Fig. 5.

Figure 3:
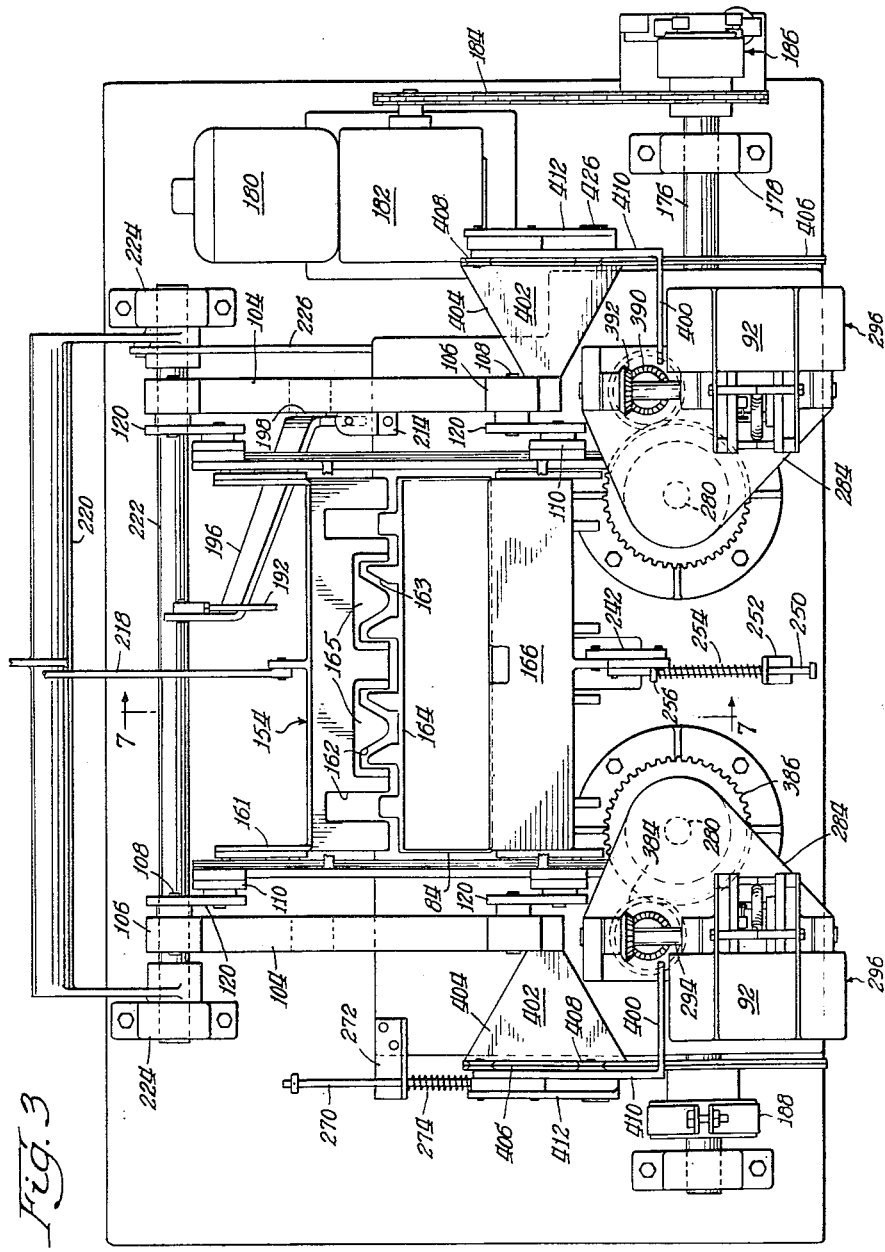
Fig. 3 is a plan view of the structure in Fig. 2.
Figure 5:
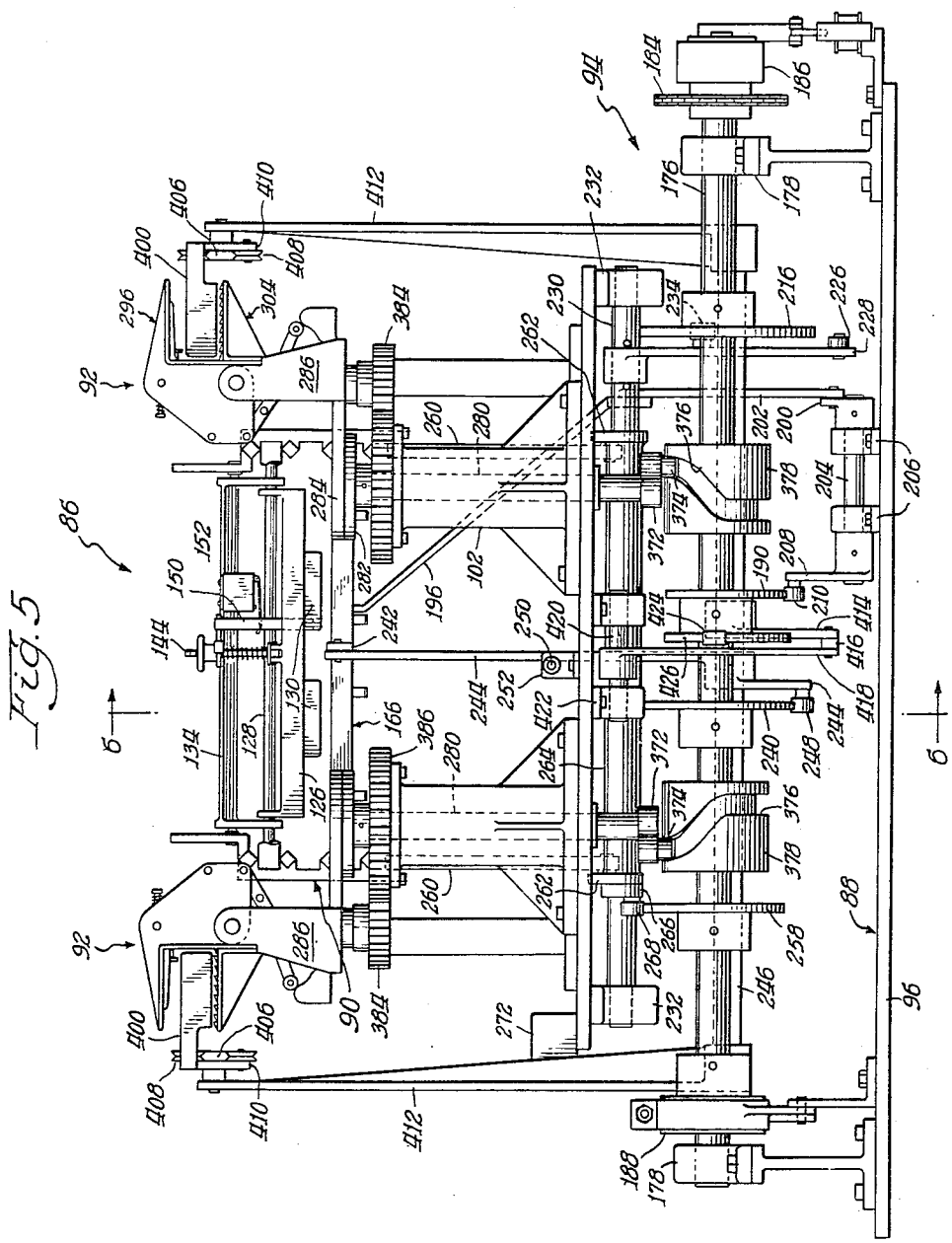
Fig. 5 is an end view of the pack separating mechanism, taken from the right side in Fig. 2.

The pack separating mechanism also includes structure for effecting a removal of the tissue packs from the breaker jaws 92 after they have reached the limit position seen in Figs. 2, 3 and 5. The pack removal mechanism for each of the breaker jaws includes a pusher bar 400 which is movably supported on a frame structure 402 positioned alongside the side frame member 104 in laterally extending relation thereto. The supporting frame 402 includes a plate 404, which is suitably secured to the forward portion of the main frame member 104, having a strap member 406 (Fig. 2) along its outer edge in parallel relation to the main frame member 104. The strap 406 provides a track for a plurality of vertically spaced rollers 408, which are rotatably mounted on a vertically extending plate 410 fixed at right angles with the pusher bar 400 in rearwardly extending relation. Thus the pusher bar 400 is mounted for movement alongside the main frame member 104 through a path which extends between the upper and lower jaw members 304 and 296, respectively, when the breaker jaw has moved to the limit position seen in Fig. 5.

Controlled movement of the pusher bar associated with each of the breaker jaws 92 is provided by a vertically extending lever 412, which is pivotally connected at its upper end to the side plate 410 of the pusher bar. The lower end of the lever 412 is keyed to the shaft 246 disposed to the rear of the main cam shaft 176. Also, keyed to the shaft 246 is a depending arm 414 (Fig. 6) which is pivotally connected, as by the link 416, with the lower end of a lever 418. The lever 418 is pivotally mounted at its upper end on a stud shaft 420 which is supported on the underlying portion of the sub-frame 100 by a pair of bearing structures 422. An intermediate portion of the lever 418 includes a rotatable cam follower 424 in position for engagement with a cam 426 secured on the cam shaft 176.

The cam follower 424 is maintained in position against the cam 426 by means of a spring biased rod 270 (Fig. 2) which is pivotally connected to the lever 412 and extends rearwardly therefrom for sliding engagement with a bracket 272 on the frame 100. A spring 274 is disposed between the bracket 272 and a fixed seat 276 on the rod, to thereby urge the rod 270 forwardly. As a result, the lever 412 is biased for movement clockwise about the shaft 246, to thereby pull the link 416 to the left and hold the cam follower 424 against the cam 426.

Thus it is seen that rotation of the cam 426 will effect a swinging movement of the lever 418, which will effect a corresponding movement of the vertically extending levers 412 to move the pusher bars 400 longitudinally of the machine 86.

Operation

Having in mind the above described structure, an explanation will be given of the operation of the illustrated mechanism, with particular attention being given to the carrier elements 92.

The detailed operation of the breaker jaws 92, will be best understood with reference to Figs. 7–14. As the pack separating machine 86 reaches the point in its cycle of operation wherein the transfer plate structure 154 enters the laterally aligned pair of breaker jaws to deposit the double pack of folded tissues therein, the leading edge of the transfer plate strikes the head portion 364 (Fig. 10) of the actuating pin 354. This disengages the notch 352 from the pin 350 and allows the spring 342 to close the upper jaw portions 304.

The double pack "A" is then held firmly between the upper jaw surface 370 and the ribs 366 on the lower jaw flange 298 and, to some extent, the transfer plate 158. The latter is then withdrawn, with the lower flap 48 of the marker sheet being grasped between the raised edge portions 165 of the transfer plate and the underlying plate 158 to unfold the flap 48.

The breaker jaw cams 378 move into a path of rotation which results in rotary movement of the shafts 280, and the jaws 92 supported thereby, in opposite directions about the axis of the shafts. Also, the horizontal rotation of the breaker jaws effects a rotation of the vertical lay shafts 382, through the gears 384 and 386, to thereby vertically swing each of the jaws about the axis of the shaft 294. This combined horizontal and vertical rotation of the breaker jaws 92 simulates the manual motion of grasping the double pack and tearing it in two sections along the line of breakable bonds 54 (Fig. 12). In other words, the two sections of the double pack are torn along the line 54 from front to rear (right to left in Fig. 10) as the gripper jaws swing away from each other in an upwardly moving curved path.

The path of movement of the breaker jaws 92 is generally illustrated in Figs. 12, 13 and 14, wherein the relative changes in the horizontal and vertical positions of the jaws is shown schematically with respect to the corresponding position of the cams 378 and the followers 374. As noted in these figures, the total vertical movement of the jaws is approximately 180° while the jaws swing through a horizontal arc of about 90°.

More particularly, the initial pack engaging position of the jaws 92 is indicated by broken lines bearing the reference "a" in Fig. 12, wherein the jaws are disposed in laterally aligned positions and the corresponding relative position of the cam 378 and follower 374 is associated therewith by a broken line arrow. As the jaws 92 rotate about their respective shafts 280 and 294, the breaker jaws separate and pass through a pair of positions indicated in full at "b" in Fig. 12. Continued rotation of the jaws 92 places them in a vertical position with the jaws disposed at an angle with respect to each other, as seen at "c" in Fig. 13, and finally to the generally parallel positions "d" where the separated packs of sheets are disposed in position for discharge from the jaws by the pusher bars 400.

As the jaws 92 approach their pack discharging position at the side of the main frame 86 forwardly of the pusher bars 400 (Figs. 2, 3 and 5), the cam follower 336 on each of the jaws (Fig. 11) strikes the outer edge of the associated cam 326. In this respect, it should be noted from the above description of the breaker jaw structure that the follower arm 330 has moved away from the jaws, to the broken line position in Fig. 10, upon the tripping of the pin 354 by the transfer plate 154. And, as the follower 336 strikes the cam 326, the arm 324 is moved into a position of engagement between the follower 338 and the shaft 294, thereby moving the jaw portion 304 away from the jaw portion 296 and repositioning the pin 350 in the notch 352.

With the breaker jaws inverted, the surface 370 of the jaw portion 304 provides the support for the separated packs of folded tissues. After the jaws have reached their limit position, seen in Figs. 2, 3 and 5, the pusher bar 400 is actuated by the cam 426 to move forwardly between the upper and lower jaw portions and thereby discharge the pack on to a conveyor belt or the like (not shown).

As indicated previously, the surface 370 is grooved along the length of the jaw to permit the sliding movement of the pack provided by the pusher bar 400. Moreover, the upper fold 48 of the marker sheet 44 is furled toward the jaw by the withdrawal of the transfer plate 154. Consequently, as the pack is moved out of the jaw by the pusher bar 400, the fold 48 assumes a position across the top of the pack. This places the fold 48 in the desired position (Fig. 16) for packaging, so that the free edge of the fold underlies the slot 32 (Fig. 17) in the box 30.

At this stage of operation, the cam 378 and cam follower 374 cooperate to again rotate the shafts 280 and 294, moving the jaws through the position indicated at "e" in Fig. 14, the position "c" in Fig. 13, and the position "b" in Fig. 12, until the pack-receiving position "a" (Fig. 12) is reached.

The described path of movement for the jaws 92 in separating the double pack of tissues and delivering the separate packs to spaced-apart positions is through a pair of non-planar, curved paths defined by the rotation of the shafts 280 and 294. This movement effects a separation of the bonded packs from front to rear, while simultaneously severing the bonds from top to bottom of the pack. Consequently, there is a relatively small number of bonds being broken at any given instant and a minimum force is therefore required for separation. Correspondingly, a minimum of restraint is required for the pack as by the gripping force exerted by the jaws 92. In handling relatively fragile sheets, such as facial tissues, the latter feature is particularly important in that it eliminates the possibility of damage to the sheets during the separation of the bonded double pack.

It is seen, therefore, that the described apparatus provides for separation of a double pack of tissues and delivery thereof to a pair of fixed stations in readiness for packaging.

It will also be seen that the improved form of carriers 92 and the mechanism associated therewith provide novel features of construction affording advantages which might well be utilized in a great number of ways. Furthermore, although described with respect to a pair of carrier jaw mechanisms, it will be apparent that a single jaw mechanism incorporating the novel features of the present invention might be advantageously employed.

We claim:

1. In apparatus of the class described, a pair of movably mounted carriers each comprising a pair of relatively movable jaws positionable in lateral alignment for gripping a separably connected two-section stack of sheet material therebetween, means for opening and closing said jaws, means for moving said pairs of jaws away from each other about a pair of generally vertical axes, and means for moving each of said pairs of jaws about a generally horizontal axis while said jaws are swinging about said vertical axes, to thereby position said pairs of jaws in angularly disposed relation to said initial position of axial alignment and spaced apart from each other to separate the sections of the separably connected two-section stack of sheet material held by the jaws, said pair of jaws continuing their movement about said axes to spaced-apart positions where the separated sections are to be removed from said jaws.

2. In apparatus of the class described, a pair of movably mounted carriers each comprising a pair of relatively movable jaws positionable in lateral alignment for gripping an elongated, separably connected two-section stack of sheet material therebetween, means for opening and closing said jaws, means for moving said pairs of jaws relative to said position of lateral alignment and away from each other through a horizontally and vertically moving arc, to thereby separate the sections of the separably connected two-section stack of sheet material held by the jaws and deposit the separated sections at laterally spaced positions with the sections inverted with respect to their initial position of engagement by said jaws.

3. In apparatus of the class described, a pair of movably mounted carriers each comprising a pair of relatively movable jaws, said pairs of jaws being positionable axially in aligned relation for gripping an elongated, separably connected two-section stack of sheet material therebetween, means for opening and closing said jaws, means for simultaneously moving said pairs of jaws away from each other about a first pair of axes, and means for simultaneously moving said pairs of jaws about a second pair of axes which are generally normal, respectively, to said first pair of axes, said latter movement occurring while said pairs of jaws are moving away from each other about said first pair of axes, to thereby position said pairs of jaws in angularly disposed relation to said initial position of axial alignment and spaced apart from each other to separate the sections of the stack of sheet material held by the jaws, and said pairs of jaws continuing their movement about said first and second pairs of axes to a pair of spaced-apart stations with the disposition of each section changed with respect to their initial position of engagement by the aligned jaws.

4. In apparatus of the class described, a pair of movably mounted carriers each comprising a pair of relatively movable jaws, said pairs of jaws being positionable in laterally aligned relation for gripping an elongated stack of sheet material therebetween, a latch means carried by each pair of said jaws for controlling the opening and closing thereof, said latch means including a first element which is actuable upon the entry of the stack between the jaws to close the jaws, means for simultaneously moving said pairs of jaws away from each other about a first pair of parallel axes, means for simultaneously moving said pairs of jaws about a second pair of axes which are generally normal, respectively, to said first pair of axes, said latter movement occurring while said pairs of jaws are moving away from each other about said first pair of axes to thereby break the stack of sheet material into two packs and invert each of the packs while transferring them to laterally spaced stations, and a second element associated with each of said latch means which is actuable during a predetermined portion of the movement of the jaws about said second axis to open said jaws and thereby release the pack for removal from the jaws.

5. In apparatus of the class described, a pair of movably mounted carriers each comprising a pair of relatively movable jaws, said pairs of jaws being positionable in laterally aligned relation to each other for gripping an elongated stack of sheet material therebetween, a frame supporting each pair of jaws for movement about a horizontal axis, each pair of jaws including a latch mechanism for holding said jaws in an open position, a first element associated with said latch and actuable upon the entry of the stack between the jaws to release the latch and close the jaws, means mounting said jaw-supporting frames for movement in opposite directions about a pair of vertical axes, means for effecting simultaneous rotation of said pairs of jaws about said horizontal axes and said vertical axes to thereby break the stack of sheet material into two packs and invert each of the packs while transferring them to laterally spaced stations, and a second element associated with each of said latch mechanisms and actuable during a predetermined portion of the movement of the jaws about said horizontal axis to open the jaws and re-engage the latch to hold said jaws open and thereby release the pack for removal from the jaws.

6. A carrier device for transporting material comprising, a pair of jaws for gripping material therebetween, a frame structure including a horizontal shaft supporting one of said jaws for movement about the axis of said shaft, the other of said jaws including means connecting said other jaw with said one jaw and affording opening and closing movement relative thereto, means biasing said other jaw toward said one jaw, a latch mechanism for maintaining said other jaw in a predetermined spaced relation to said one jaw comprising a pin on said other jaw, an arm pivotally mounted on said shaft and including means for engaging said pin to thereby support said other jaw in spaced relation to said one jaw, means biasing said arm toward said pin, means associated with said one jaw which is actuable upon movement of material within said jaw to move said arm in opposition to the biasing means therefor, additional means carried by said other jaw and operable to move said other jaw away from said one jaw in opposition to said biasing means for said jaws, an element mounted on said frame structure in the path of said additional means as the latter rotates about said horizontal axis with said jaws, whereby engagement with said element causes said additional means to move said pin to a position of engagement with said arm to thereby fix said other jaw in spaced relation to said one jaw.

7. In a carrier device for handling sheet material, an upper jaw and a lower jaw, means supporting said jaws for relative movement and for movement together about a given axis, whereby said jaws may be opened to admit sheet material therebetween and then closed to firmly engage the sheet material, and whereby said jaws may be rotated about said axis to reverse the relative position of said jaws and place said lower jaw above said upper jaw, each of said jaws having a material-engaging surface including a plurality of generally parallel rib portions thereon, the rib portions on one of said jaws being angularly disposed with respect to the rib portions on the other of said jaws, whereby when said jaws are closed said rib portions cooperate to prevent relative displacement of the sheet material engaged by said jaws, and whereby said rib portions afford easy movement of the sheet material in the direction of the rib portions on the jaw supporting the sheet material when said jaws are opened.

8. A carrier device for handling sheet material comprising a supporting frame structure, a pair of relatively movable jaws including an upper jaw and a lower jaw for gripping a pack of sheet material therebetween, each of said jaws having a material engaging surface including a plurality of generally parallel rib portions thereon, the rib portions of one of said jaws being generally normal to the rib portions of the other of said jaws, means for opening and closing said jaws, a first support means mounting said jaws for rotation together about a horizontal axis to thereby reverse the relative positions of said jaws and place said lower jaw above said upper jaw, a second support means carried by said frame structure and mounting said first support means and jaws for rotation about a vertical axis, means interconnecting said first and second support means for movement together about their respective axes, whereby said jaws may grip a pack of sheet material therebetween at one station and invert the pack while transferring it to a laterally spaced station where the pack is released, and whereby said rib portions on said upper and lower jaws cooperate to prevent displacement of the pack during said transfer and yet afford easy movement of the pack in the direction of the rib portions on the jaw supporting the pack when said jaws are opened.

References Cited in the file of this patent
UNITED STATES PATENTS

| | | |
|---|---|---|
| 911,167 | Schroder et al. | Feb. 2, 1909 |
| 1,523,517 | Doty | Jan. 20, 1925 |
| 1,958,846 | Chrisensen | May 15, 1934 |
| 2,061,085 | Price | Nov. 17, 1936 |
| 2,259,728 | Bridges | Oct. 21, 1941 |